Patented May 16, 1939

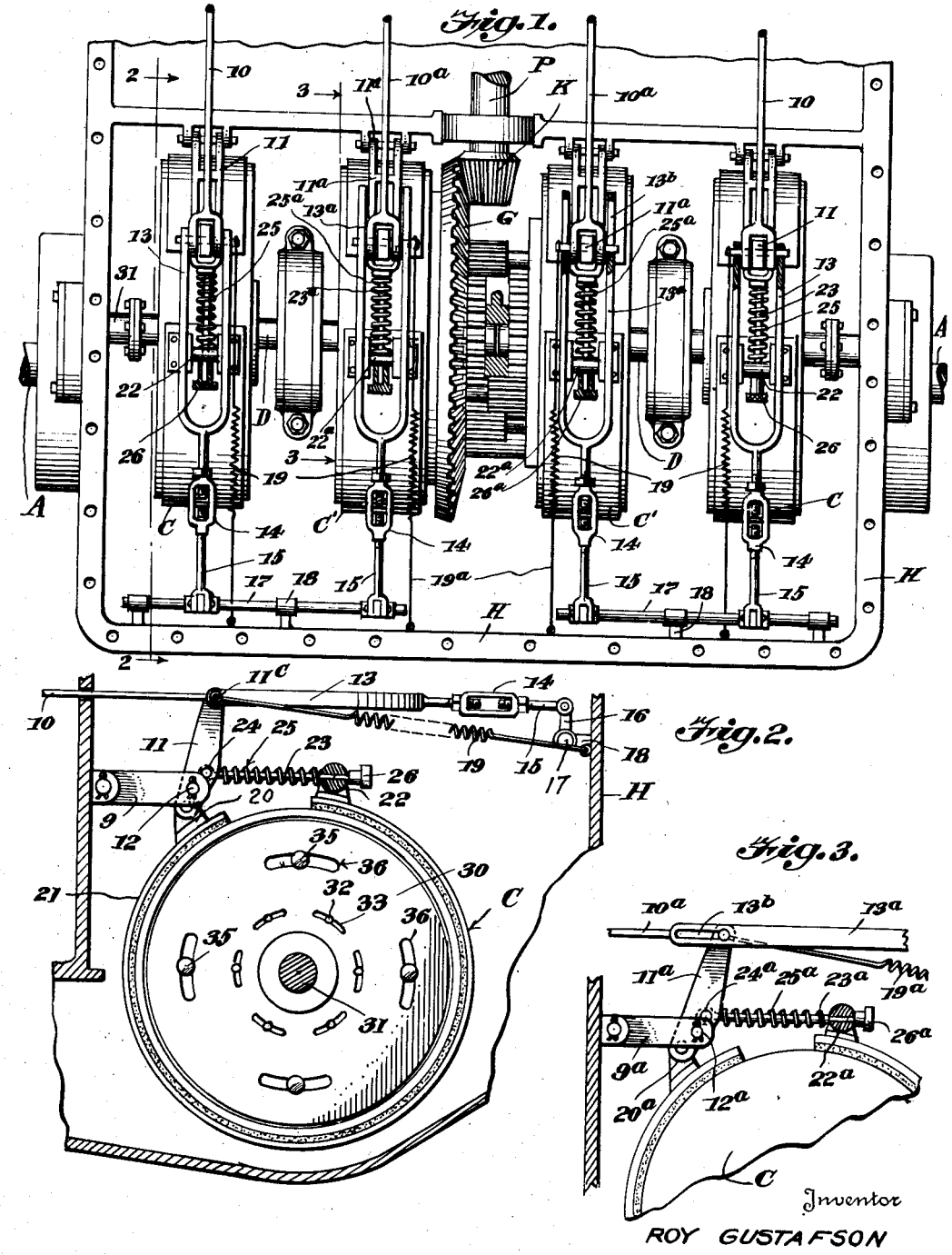

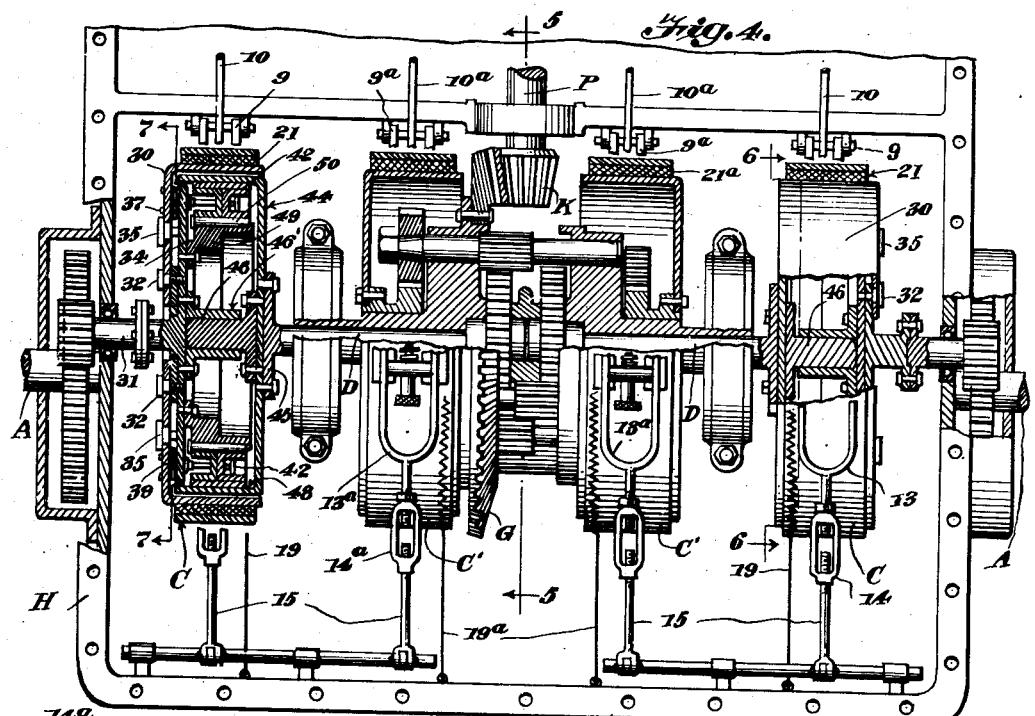

2,158,935

UNITED STATES PATENT OFFICE 2,158,935

CLUTCH STEERING MECHANISM FOR TRACTORS

Roy Gustafson, Fields Landing, Calif.

Application July 23, 1936, Serial No. 92,197

3 Claims. (Cl. 192—13)

This invention relates to a clutch steering mechanism for tractors, and other similar vehicles, and has for one of its principal objects the production of a simple and efficient means for applying a braking action to the driving axle upon either side of the differential gear, the means for applying the braking action embodying a pair of braking elements, one of which may be individually applied without applying the other braking element, or both of which may be applied through the medium of a common operating means whereby the steering of the tractor may be easily controlled.

This application constitutes a continuation in part of my application relating to Clutch steering mechanism for tractors, filed November 30, 1935, Serial Number 52,417.

A further object is the production of a steering mechanism for tractors, and other similar vehicles, for producing a simple and efficient means for steering a tractor and the like through the use of a sectional drive shaft, the sections of which are connected by means of a clutching means controllable by the operator whereby the steering of the tractor will be responsive to the operator's control to cause the tractor to pivot turn or steer at the will of the operator.

Other objects and advantages of the present invention will appear throughout the following specification and claims.

In the drawings:

Figure 1 is a top plan view of a portion of a tractor chassis showing the clutch steering mechanism mounted upon the driving axle in association with the differential gear;

Figure 2 is a transverse sectional view taken on line 2—2 of Figure 1;

Figure 3 is a partial transverse sectional view taken on line 3—3 of Figure 1;

Figure 4 is a top plan view somewhat similar to Figure 1, certain parts and elements being shown in horizontal section;

Figure 5 is a transverse sectional view taken on line 5—5 of Figure 4;

Figure 6 is a transverse sectional view taken on line 6—6 of Figure 4, through one of the clutch elements;

Figure 7 is a transverse sectional view taken on line 7—7 of Figure 4;

Figure 8 is a rear elevational view of a portion of a tractor in reduced size, and illustrating conventional traction elements for supporting opposite sides of the vehicle.

By referring to the drawings, it will be seen that A designates the axle which may be supported or carried in a conventional manner by the tractor element T such as wheels, caterpillar mechanism, or the like. A rear driving shaft D is supported upon or within a housing H, and this shaft consists of sections, as shown in Figures 1 and 4, connected to various units which control the operation of the shaft. A ring gear G is driven by a pinion gear K carried by a power shaft P. The gear G drives a suitable differential gearing mechanism mounted in the conventional manner. The housing H is preferably closed in order to house the working parts of the mechanism, and the parts may run in oil or other lubricant.

A clutching element C and a differential braking element C' are mounted one each upon either side of the differential drive. This will constitute a separate group upon opposite sides of the differential, each group embodying a clutching element C as illustrated, and a differential braking element C' as illustrated in Figure 1. The clutching elements C are specially constructed whereas the differential braking elements C' are of the conventional type such as may be necessary in a controlled differential steering mechanism. A brake control rod 10a is employed for actuating the differential braking element C', each differential braking element C' having an individual control rod 10a as shown. An operating rod 10 is employed for actuating each individual clutching element C, the purpose of which will be described in full in the following.

The rod 10 is connected to the upper end of the lever 11 which is pivotally secured, as at 12, to a pivoted supporting bracket 9. A yoke 13 is pivotally connected to the lever 11, as at 11c. The rear end of the yoke 13 is connected to a turnbuckle 14, and this turnbuckle 14 is connected to a link 15. This link 15 is in turn connected to a rocker arm 16 which is carried by the supporting rod 17 journaled, as at 18, to the housing H. An operating mechanism for the clutching element C and braking element C' is mounted upon either side of the differential, as shown in Figure 1, and it is only thought necessary to describe specifically the parts of the operating mechanism located upon one side of the differential. The lever 11 is in turn pivotally connected, as at 12, to a supporting link 9, and the lower or inner end is secured to the brake band connection 20 carried by one end of the brake band 21. The opposite end of the brake band 21 carries a journal 22 through which extends a rod 23, the rod being connected at its opposite end, as at 24, to the lever 11. A coil spring 25 is carried by the rod 23 to spread the ends of the band 21 apart or free the same when the brake is disengaged, and an adjusting nut 26 is threaded upon the outer end of the rod 23 to adjust the brake band 21. The trow of the lever 11 may also be adjusted through the manipulation of the turnbuckle 14.

A coil spring 19 is connected to the upper end of the lever 11 and also to the casing H to assist the lever 11 to return to its rearwardly swung position after the pull on the rod 10 is released.

As previously stated, the differential braking elements C' are of the conventional type and are carried by the shaft D upon opposite sides of the power shaft P and gear G of the differential. The shaft D, however, is provided at its outer end with a pilot stub shaft, such as is illustrated in Figures 4 and 6, for the purpose of supporting the specially constructed clutching elements C carried at the opposite ends of the shaft D.

The clutch or clutching elements C are of the same structure as illustrated and described in my application Serial Number 52,417, filed November 30, 1935, but for the purpose of clearly understanding the present structure, it is thought necessary to describe in some detail the particular structure of the clutch element C. The clutch mechanism comprises an outer drum 30 which is carried by a section 31 of the driving shaft D and is mounted thereon by means of a plurality of headed bolts 32 which pass through the arcuate slots 33. A disc plate 34 is anchored to the section 31 of the shaft D and is mounted within the outer drum 30, as shown in Figure 4, the headed bolts 32 also engaging the disc plate 34, as shown. The plate 34 carries additional headed bolts 35 which extend through the arcuate slots 36 to anchor the disc 34 and outer drum 30 in assembled relation, but at the same time allowing the outer drum 30 to oscillate with respect to the disc plate 34. A plurality of threaded studs 37 are arranged in staggered relation in diametrically opposite positions near the periphery of the outer drum 30 and upon the inner face of the drum, as shown in Figure 7. Trigger shafts 38 are mounted to extend between the respective studs 37 of each group, and these trigger shafts 38 are carried by and extend at right angles to the face of the disc plate 34, as shown. Trigger fingers 39 are carried by the trigger shafts 38 and extend between the respective studs 37 of each group. These fingers 39 are adapted to normally remain out of contact with studs 37. As the outer drum 30 oscillates with respect to the fixed disc plate 34 when the brake band 21 is applied in gripping relation to the outer drum 30, the trigger shafts 38 will be rotated, the arms 40 carried by the inner ends of the trigger rods 38 will be swung, pulling upon the links 41 and causing the wedge-shaped clutching segments 42 to be moved in the direction of the arrows shown in Figure 6 to disengage the shoes 42. Suitable extension springs 43 are carried by clutching segments or shoes 42 to exert pressure against arms 40 in their normal engaged position, thereby keeping shoes 42 against drum 44 in a normal engaged position. I preferably employ four clutching segments or shoes 42 which are preferably arranged in pairs having the large ends of the segments connected to the links 41, as shown. These clutching segments or shoes 42 are arranged in circular formation within the inner drum 44, as shown in Figure 6, which inner drum is adapted to be fitted within the outer drum 30 and is carried by the flange 45 at the end of axle D. A pilot stub shaft 46 is carried by the inner face of the inner drum 44. The clutching segments or shoes 42 are mounted to engage the inner face 48 of the inner drum 44 and are prefeably formed of abutting sections which are substantially U-shaped in cross section and bolted or secured together in any suitable or desired manner to simulate an I-beam structure in cross section. In this way, a relatively wide gripping face will be produced for each clutching segment or shoe 42. The pilot stub shaft 46 is journaled in the pilot bearing 46' carried by the inner face of the disc plate 34. This will allow the inner drum 44 and the shaft D to freely rotate when the clutch on unit C is disengaged. Because of this structure the unit may be easily removed for repair or replacement.

In order to properly support the shoes 42, I provide guide plates 49 which are secured to the inner face of the disc 34 directly under the clutching segments or shoes 42, as shown in Figure 6. These guide plates 49 are provided preferably with roller bearings 50 which engage the inner faces of the clutching segments or shoes 42, and as the clutching segments or shoes 42 of the upper and lower pairs of shoes 42, as shown in Figure 6 are spread apart in the opposite direction of the arrows shown in Figure 6, the shoes 42 will be brought into wedging engagement with the inner face 48 of the inner drum 44 due to the wedge-shaped formation of the shoes 42 and the sliding movement of the shoes over the rollers 50 which are carried by the guide plates 49, the guide plates 49 being closer to the inner face 48 of the drum near their outer ends 52 than at their inner ends 51. The outer ends of the shoes 42 of one pair are connected to the bell crank slotted levers 54, which levers are pivoted, as at 55, to the plate 34 and constitute a guide for the outer ends of the shoes 42. Springs 56 are preferably employed to normally pull the outer ends 52 of the shoes of the clutching segments 42 towards each other, the shoes 42 normally being engaged tightly in the drum 44 except when the parts are operated to disengage same. The springs 43 and 56 co-operate to hold the shoes in wedging engagement with the wedge plates 49, and the rotatable frictional force of the drum 44 against the lining of the tapered shoes 42 in either direction will cause two of the shoes to ride up on the wedge plates 49 for firm frictional engagement with the drum 44. The slotted ends of the levers 54 permit the movement of the small ends of the shoes 42 toward each other. Consequently, the greater power applied to the drum 44 will cause a tighter wedging action of the shoes upon the drum 44. When the trigger fingers 39 are swung by the studs 37 to release the shoes, the frictional force of the drum 44 will tend to disengage the shoes 42.

As stated above, the springs 56 normally pull the small ends of the shoes 42 toward each other and into gripping engagement with the drum 44— see Figure 6—causing the shoes 42 to ride upon the wedges or guide plates 49 into normal wedging engagement between the inner face of the drum 44 and the rollers 50 of the wedges or guide plates 49. The shoes 42 are shown in disengaging position in Figure 6 or in the position where the trigger fingers 39 have been swung by contact with the studs 37 thereby swinging the arms 40 to pull the shoes 42 to a releasing position in the direction of the arrows shown in Figure 6. As soon as the studs 37 move out of contact with the fingers 39, the springs 43 and 56 will automatically move the shoes 42 into wedging engagement with the drum 44. Friction on one or any of the shoes 42 engaging the drum 44 will cause all of the shoes to be applied, since the shoes are all connected, as shown in Figure 6. The tension springs 56 will tend to pull the small ends of the adjoining sets of shoes toward each other. The bell crank levers 54 which are pivoted, as at 55, have slotted engagement with the small tapered ends of the adjoining pairs of shoes 42. The slotted ends of the levers 54 guide the shoes and prevent the displacement thereof and at the same time allow proper movement of the tapered ends of the shoes 42. The movement is very slight, just enough to provide clutching engagement and release the arms or levers 40 and links 41 and at the same time push or force the large ends of the adjoining shoes 42 apart from, or away from, the action of the springs 43. All four of the shoes 42 will in this manner be forced into wedging engagement against the drum 44 and rollers of the guide plates 49. This will lock the two drums 44 and 30 together.

By noting Figure 1 it will be seen that a differential braking element C' is located to each side of the differential and adjacent the differential. A clutching element C is also located to each side of the differential, as shown in Figure 1, it being noted that the differential braking elements C' located upon opposite sides of the differential are also interposed between the differential and the clutch elements C.

Each differential braking element C' is controlled by an individual differential brake control rod 10a. Each rod 10a engages a lever 11a, the rod 10a engaging the upper end of the lever 11a and the upper end of the lever 11a also engaging the slotted end of the yoke 13a through the medium of a pin passing through the slotted end to allow the lever 11a to swing without operating the yoke 13. The rod 10a may be pulled ahead or forwardly and swing the lever 11a forwardly without pulling upon the yoke 13a in the manner as will be hereinafter described. The lever 11a is connected to one end of the brake band of the differential braking element C', as at 21a, note Figure 3. The brake band of the differential braking element C' is connected at its opposite end to a journal 22a through which journal passes a pin 23a, the opposite end of the pin 23a being secured to the lever 11a, as at 24a, and a spring 25a is carried by the pin 23a for the same purpose as set forth in describing the structure illustrated in Figure 2. The structure shown in Figure 3 is identical to that shown in Figure 2 with the exception of the structural features of the differential braking element C', and the fact that the yoke 13a is slotted, as at 13b, to allow the lever 11a to swing forwardly without pulling action upon the yoke 13a. The lever 11a is anchored upon a pivoted link 9a similar to the link 9 described in connection with Figure 3.

To steer by differential

When it is desired to turn the tractor or vehicle slightly toward the left, by way of illustration, the left-hand rod 10a is pulled forwardly. This will pull the upper end of the corresponding lever 11a forwardly causing the corresponding band 21a to apply pressure on the differential mechanism at one side thereby slowing down shaft D to one side of the differential—note Figure 1.

When lever 10a is moved forward to steer by differential, axle A on one side of the tractor or vehicle will turn slower than that on the opposite side thereof, causing tractor or vehicle to turn in the desired direction. Since the yoke 13a is slotted as at 13b at its forward end, the lever 11a may move forwardly without moving the yoke 13a since the pins 13c will merely slide in the slots 13b and will not pull upon the yoke 13a, and will not rotate the shaft 17. The vehicle may in this way be steered merely by pulling upon the rod 10a, and not the rod 10. Steering of the vehicle in this manner results in forward or rearward power propulsion of the vehicle suitably moving the vehicle forwardly or rearwardly even though the tractor is turning in a regular curve. The power is not disconnected on either traction element but merely slowed down on one side through the internal differential gearing such for instance as the unit C' and speeded up on the other side. In mud or on a side hill, this is a very important feature since by this means the tractor will continually move in the desired direction. This operation is controlled by the movement of one lever by the operator and the lever may be operated while the operator is either in a standing or a sitting position. When the rod 10 is pulled, the clutching element C is released or disengaged cutting off the driving power of the shaft D, and the braking element C' is also engaged. It should be noted that when the rod 10a is pulled, one of the braking elements C' is in braking engagement to slow down the shaft D upon one side of the differential, the clutching element C being in clutching engagement to furnish driving power. Then, by pulling upon the rod 10 the clutching element C is disengaged and the braking element C' is applied or engaged, bringing the vehicle to a stop.

To pivot steer

By pulling the rod 10 forwardly, the lever 11 is swung in a forward direction and will swing upon its pivot 12, note Figure 2. This movement will pull the two ends or the band 21 toward each other and cause the same to be tightly drawn around the drum 30. When this is accomplished, the plate 34 will slightly rotate with respect to the drum 30 and the studs 37 will engage and swing the trigger fingers 39, thereby rotating the shafts 38 and swinging the arms 40 to pull the adjoining shoes 42 which are connected to the arms 40, together at their large ends. In this way, the shoes will be moved to a disengaging position, or to a non-wedging position, when pressure from the springs 43 is overcome from the arms 40 due to the pull of the links 41. The friction of the drum 44 against the shoes 42 will tend to release the shoes 42. It should be noted that when one shoe 42 moves into a disengaging position, the fulcrum lever 54 through the medium of the slotted ends will move the adjacent shoes 42 to a disengaging position. The springs 56 and springs 43 will normally hold the shoes in a clutching or engaged position when pressure is released from the trigger fingers 39. The drum 30 and plate 34 may slightly oscillate with respect to each other, and the friction of the shoes upon the bands will tend to release the shoes 42 or engage the shoes 42, as the band 21 is released or engaged, as the case may be.

It should be understood that the shoes 42 are disengaged on pivot turn, the shifting drum 30 causing the studs 37 to swing the trigger fingers 39 when the bolts 35 reach the ends of the slots 36 and when the band 21 is in an engaging position on unit C. The axles A on one side of the vehicle and shaft D will be locked together and on the pivot side the axle A and shaft D will be disengaged. At the same time as the yoke 13 moves forwardly under the pull of the rod 10, the shaft 17 will be rotated and the yoke 13a will be pushed forwardly causing the lever 11a to swing forwardly and apply the band of the differential braking element C', in this way locking the differential or slowing down axle D. By slight additional pressure on band 21 of clutching element C through additional movement of rod 10, the bolts 32 and 35 will come up firmly against the ends of their respective slots 33 and 36 on the drum 30, causing drum 30 and axle 31 to be disengaged, thereby cutting off the driving power from the axle A and causing the vehicle to pivot on that track of the disengaged side. Thus, by using required pressure or the movement forward of rod 10, the operator can short steer or pivot. With movement of only one rod 10 operator does three things: (1) disengages clutch C through movement of shoes 42; (2) locks or slows down differential action through leverage from clutching element C to the next adjoining braking element C'; (3) applies brake on track of disengaged side through additional pressure of band 21 on drum 40 by further movement of rod 10. This will cause the drive of the vehicle to speed up on one side and stop on the opposite side and, because of the well known differential action of the differential mechanism, an efficient pivot steering action will be accomplished by merely pulling the rod 10 forwardly and without operating the rod 10a. It should be understood that when it is desired to retard the movement of the vehicle or bring the same to a stop, the operating mechanism for the rods 10a may be both actuated at the same time, or the operating mechanism for the rods 10 may be both applied at the same time. In other words, the differential braking elements C' upon opposite sides of the differential may be both applied, or, as an optional means, the clutch elements C upon opposite sides of the differential may be both applied.

A coil spring 19a is connected to the upper end of the lever 11a, and also to the casing H, to assist the lever 11a to return to its rearwardly swung position after the pull on the rod 10a is released.

As illustrated in Figure 1, I preferably employ a group of clutching elements and differential braking elements upon opposite sides of the differential. The outer clutch element on each side is designated by the letter C, and the inner braking element on each side adjacent the differential is designated by the letter C'. It will, therefore, be seen that by applying the differential braking mechanism C' upon one side, this will reduce the speed of one track and allow the opposite track to speed up and steer the vehicle in the desired direction. As the differential braking element upon one side of the differential is applied, one tractor element will reduce its speed and the opposite tractor element will increase its speed in proportion to the pressure applied by the operator upon the differential braking element C' and allow the operator to properly steer the vehicle to the proper or desired amount of turn. When one differential braking element, such as the element C' is slowed down causing one tractor element to reduce its speed and the opposite tractor element to increase its speed the tractor will move in one direction but will change its angle of direction. When it is desired to pivot turn, however, the pull rod 10 will be actuated applying the clutch element C and this will completely stop the tractor element upon one side of the vehicle allowing the tractor element on the opposite side to speed up transferring all available power to the outside tractor element and causing the vehicle to pivot steer the tractor element which has stopped constituting a fixed pivot. The vehicle may therefore turn within a minimum area or turn in close quarters, since the tractor element upon one side will be completely stopped and the available power and movement will all be applied to the outside tractor element causing the vehicle to completely swing upon its pivot in substantially a circle. This results in a feature that permits the operator to stand if desired, and merely one hand is required to steer at any time where the vision of the operator is obstructed and the operator is required to stand in order to obtain a proper vision.

As stated previously, the parts may be so constructed as to work in oil within the housing H and for this purpose the brake band 21 should be constructed of suitable or desired oil-resisting material for accomplishing the desired result, and at the same time allowing a cushioning grip for the braking elements C' and clutching elements C. It should be understood that through the medium of the arrangement described and illustrated, the steering of a vehicle may be easily accomplished, and the braking elements C' and clutching elements C may be easily and readily applied.

It has been found by experience that the steering of a tractor of this type may be more easily accomplished with less effort on the part of the driver by utilizing a lever mechanism which may be pulled toward the operator. I am aware of the fact that attempts have been made to steer the tractor through the operation of a steering wheel. This has been found, however, to be impractical and difficult in operation. Furthermore, the present assembly adds a clutch mechanism in conjunction with the control differential steer thereby obtaining the advantages of both the clutch and the differential steer structure. This particular combination or assembly provides for the steering of the tractor by permitting the stopping of one traction element to provide a fixed pivot and allow the other traction element to swing around the fixed pivot to produce a complete and positive pivot steer.

The present assembly will permit the replacement of parts or the repair of one unit within a minimum amount of time eliminating the necessity of entirely tearing down the structure for the purpose of replacement.

Having described the invention, what I claim as new is:

1. In combination with a vehicle, a driving shaft, a braking element carried by said driving shaft, a clutching element carried by said driving shaft, means for independently operating the braking element to effect a braking influence upon said driving shaft, means for releasing the clutching element, means for connecting the last two mentioned means for releasing the clutching element and simultaneously and automatically operating the braking element, said means for releasing the clutching element comprising a lever and an operating rod pivoted to the lever and serving to move the lever in a direction to effect release of the clutching element when the operating rod is pulled in one direction; said means for operating the braking element comprising a lever and a brake control rod pivoted thereto and serving to move the lever in a direction to apply the brake when the rod is pulled in one direction, and means connecting the operating rod of the clutching element with the brake control rod of the braking element for simultaneously operating the braking element and releasing the clutching element and also permitting the operation of the braking element independently of the releasing of the clutching element, the last mentioned means consisting of a rocker shaft, arms extending from said rocker shaft, a yoke pivoted to the lever of the clutch operating means, a yoke pivotally and slidably connected to the lever of the brake operating means for permitting limited movement of the levers independently of each other, and rods connecting said yokes with arms of the rocker shaft for transmitting movement from one yoke to the other.

2. In combination with a vehicle, a driving shaft, a braking element carried by the driving shaft, a clutch element carried by the driving shaft, a brake control rod, means for connecting the brake control rod with the braking element, an operating rod for said clutching element, means for connecting the operating rod with the clutching element for releasing the clutching element as the operating rod is pulled in one direction, a yoke connected with the operating rod, a slotted yoke connected with the brake control rod to permit free forward movement of the brake control rod independently of the slotted yoke, and means connecting the yoke of the clutching element and the slotted yoke of the braking element whereby the brake control rod may be moved forwardly to independently operate the braking element, and whereby the forward movement of the operating rod of the clutching element will simultaneously release the clutching element and operate the braking element to effect a braking influence upon the driving shaft.

3. In combination with a vehicle, a driving shaft, a braking element carried by the driving shaft, a clutch element carried by the driving shaft, a brake control rod, means for connecting the brake control rod with the braking element, an operating rod for said clutching element, means for connecting the operating rod with the clutching element for releasing the clutching element as the operating rod is pulled in one direction, a yoke connected with the operating rod, a slotted yoke connected with the brake control rod to permit free forward movement of the brake control rod independently of the slotted yoke, means connecting the yoke of the clutching element and the slotted yoke of the braking element whereby the brake control rod may be moved forwardly to independently operate the braking element, and whereby the forward movement of the operating rod of the clutching element will simultaneously release the clutching element and operate the braking element to effect a braking influence upon the driving shaft, and link means connecting the yokes comprising a rock shaft and adjustable connections between the rock shaft and said yokes.

ROY GUSTAFSON.